United States Patent
Harris et al.

Patent Number: 5,762,853
Date of Patent: Jun. 9, 1998

[54] METHOD OF ENCAPSULATING A SENSOR INTO A PANEL BODY

[75] Inventors: Bradley D. Harris, Farmington; Gregory J. Lang, South Ogden, both of Utah; W. Gary Wirt, Clinton Township, Mich.

[73] Assignee: Morton International, Inc., Chicago, Ill.

[21] Appl. No.: 625,108

[22] Filed: Apr. 1, 1996

[51] Int. Cl.$^6$ .......................... B29C 35/02; B29C 41/20
[52] U.S. Cl. .......................... 264/254; 264/255; 264/272.13
[58] Field of Search .......................... 264/250, 254, 264/255, 271.1, 272.11, 272.15, 272.13, 309

[56] References Cited

U.S. PATENT DOCUMENTS

| | | | |
|---|---|---|---|
| 3,312,197 | 4/1967 | Smith | 264/255 |
| 3,819,205 | 6/1974 | Dunford et al. | 280/150 AB |
| 4,228,115 | 10/1980 | Gardner et al. | 264/46.4 |
| 4,310,174 | 1/1982 | Sundeen et al. | 280/731 |
| 4,320,573 | 3/1982 | Larson | 29/622 |
| 4,325,568 | 4/1982 | Clark et al. | 280/731 |
| 4,410,387 | 10/1983 | Halkerston et al. | 264/250 |
| 4,934,735 | 6/1990 | Embach | 280/731 |
| 5,002,306 | 3/1991 | Hiramitsu et al. | 280/731 |
| 5,062,661 | 11/1991 | Winget | 280/731 |
| 5,071,683 | 12/1991 | Verwilst et al. | 427/420 |
| 5,073,318 | 12/1991 | Rohrlach et al. | 264/309 |
| 5,085,462 | 2/1992 | Gualtier | 280/731 |
| 5,098,630 | 3/1992 | Ogiu et al. | 264/272.15 |
| 5,186,490 | 2/1993 | Adams et al. | 280/731 |
| 5,193,412 | 3/1993 | Hashiba | 74/552 |
| 5,198,629 | 3/1993 | Hayashi et al. | 200/61.54 |
| 5,492,586 | 2/1996 | Gorczyca | 264/272.15 |
| 5,510,074 | 4/1996 | Rose | 264/272.15 |

OTHER PUBLICATIONS

SAE Technical Paper Series, "A Production Proven Polyurethane Skin Technology for Interior Trim Parts", T. Karwan et al., 4 pgs., Feb–Mar. 1995.

*Primary Examiner*—Angela Y. Ortiz
*Attorney, Agent, or Firm*—George W. Rauchfuss, Jr.; Gerald K. White

[57] ABSTRACT

A flexible sensor, such as a membrane switch, is molded into a plastic automotive panel by a low temperature, low pressure, method which avoids damage to the switch while insuring its placement at a desired depth below the surface of the panel. This is achieved by a process which includes a first step of spraying a mold with a rapid gelling liquid plastic to a preselected thickness. After the plastic has firmed, the sensor is placed thereon and is encapsulated by spraying with a second layer of the plastic. The resulting shell with the embedded sensor may then be provided with a backing, such as a plastic foam.

7 Claims, 1 Drawing Sheet

METHOD OF ENCAPSULATING A SENSOR INTO A PANEL BODY

TECHNICAL FIELD

This invention relates to the encapsulation of a flexible sensor into a plastic panel. More particularly, it pertains to the manufacture of a plastic panel, such as an airbag cover for a vehicular instrument panel, having embedded therein a flexible sensor, such as a membrane switch.

BACKGROUND ART

It is a common practice to provide plastic automotive panels, such as driver's side airbag panel covers, which incorporate switches such as horn switches or function keys. Membrane switches are often employed for these applications.

Membrane switches are well known in the art. A membrane switch comprises a pair of slightly spaced conductive plates. At least one of the plates is resilient to form a manually operable member. When pressed, it bends to make contact with the other plate thereby closing a circuit. It is a common practice to apply such a switch to the inner surface of a steering wheel airbag cover. The switch is further supported and isolated by a "backer" which is a stiff thick or ribbed piece of plastic mounted behind the switch. The backer lies against the folded airbag to provide a uniform horn activation force.

There are a number of problems connected with this prior art method of installing switches. One problem is an increase in airbag module weight as a result of the need for a switch backing. Some installations employ a double airbag cover in the form of inner and outer covers with the switch therebetween, increasing complexity and cost. If the switch and backer are attached to the back of the airbag module door, the increased weight of the door makes it more difficult to keep it attached to the module during airbag deployment. Another problem is that the plastic airbag cover is susceptible to cold stiffening. In cold weather this results in poor tactile feedback and more difficulty in honking the horn. Typically, these switches are not molded into the cover because the molding temperatures and pressures are excessive and can cause the switches to deform or become inoperative.

Some prior art solutions to these problems have included pockets formed in the cover into which the switch may be inserted. However, this increases the cost and the labor required. In the case of instrument panels, switches are normally separate assemblies. This requires openings in the panel to house the switches. The resulting cracks surrounding each switch are dust collectors. Accordingly, it would be desirable to mold switches into the panel so the foregoing problems could be avoided.

In addition to switch damage, another problem arises when it is attempted to mold a membrane switch into a panel. This is the difficulty of maintaining a switch at the proper position within the panel during the molding process. Because of problems such as the cold stiffening referred to above, it is important to position the switch at a minimal depth below the surface of the plastic panel in order to achieve the desired tactile feedback.

Accordingly, it is a primary object of the present invention to provide an improved method for molding a flexible sensor, such as a membrane switch, into the body of a plastic automotive panel. Other objects, features, and advantages will become apparent from the following description and appended claims.

DISCLOSURE OF THE INVENTION

In the method of this invention, the mold is first sprayed with a liquid plastic which cures and gels to a resiliently solid condition at low temperature and pressure. This first spraying step is controlled to form an initial layer of a desired thickness. The membrane switch is then positioned on this initial layer. Thereafter the plastic material is again applied so as to encapsulate the switch, after curing, into a hardened resilient shell. A foamed plastic may be applied to the shell to form the basic bulk of the final panel.

BEST MODE FOR CARRYING OUT THE INVENTION

Figure 1:
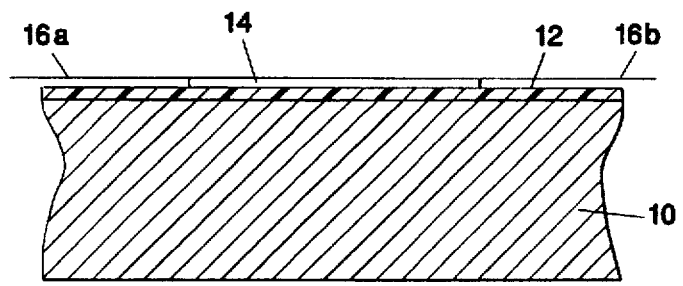
FIG. 1 is a cross-section illustrating the initial steps in the practice of the invention.
Figure 2:
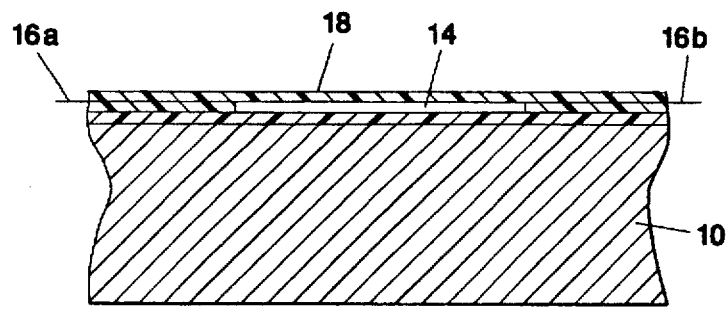
FIG. 2 is a view similar to FIG. 1 illustrating a further step in the practice of the invention.

FIG. 1 illustrates a portion of a mold 10. The mold defines a cavity onto which is deposited a first layer 12 of a plastic material in liquid form. The plastic of first layer 12 has a relatively rapid, low temperature, cure rate. When it has become substantially solid, a flexible sensor, such as a membrane switch 14 is positioned upon the surface of the first layer 12. The leads 16a, 16b of the switch extend outwardly in any desired manner for eventual connection to an external circuit. If desired or necessary an adhesive may be employed between the membrane switch 14 and the first layer 12. Thereafter, a second layer 18 of the same, or a different, plastic in liquid form and having similar characteristics to that of the first layer is applied to encapsulate and enclose the membrane switch 14.

In accordance with this invention the gellable liquid plastic formulation is preferably a gellable polyurethane formulation. The process of forming a gellified polyurethane on the surface of a mold cavity is generally known in the art. One example of such a process is described in U.S. Pat. No. 5,071,683 of J. Verwilst et al. Any suitable sprayable polyurethane reaction mixture capable of forming the desired gellified polyurethane on the mold surface may be employed in the process of this invention. Any suitable polyester or polyether polyols, low molecular weight polyfunctional chain extenders and cross-linking agents such as diols, triols, diamines and the like, and polyisocyanates may be employed. As examples of suitable reactants there may be mentioned Voranol polyether polyols available from Dow Chemical Company, butanediol or trimethylolpropane as chain extenders and cross-linking agents and hexamethylene diisocyanate (HMDI) available from Bayer Company as Desmodur W polyisocyanate. Reference may be made to the aforementioned U.S. Pat. No. 5,071,683 for further examples of the process and suitable formulations for use as the process of obtaining a gellified polyurethane on the mold surface.

Figure 3:
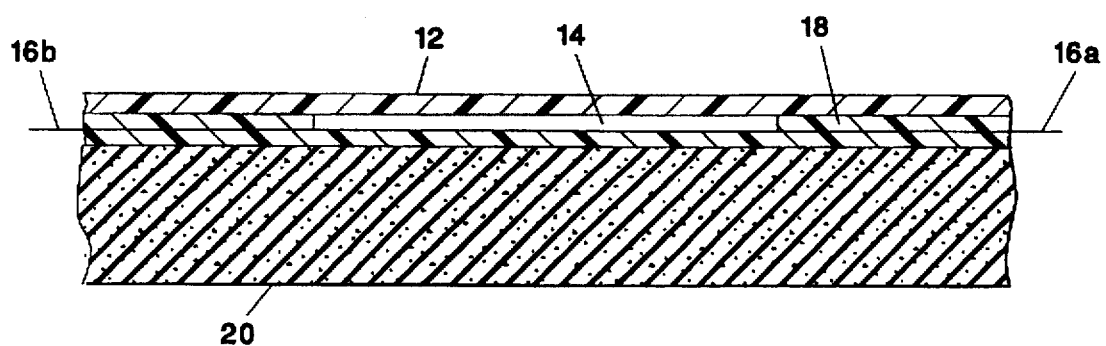
FIG. 3 illustrates a portion of the panel following removal from the mold and filling with a backing material.

When fully cured, the composite shell comprising first layer 12, second layer 18, and the encapsulated membrane switch 14 may be removed from the mold. Thereafter, or even with the shell remaining in the mold, a back foaming process is employed to supply the bulk desired in the final panel. FIG. 3 illustrates a portion of the shell formed from the two layers 12, 18 as removed from the mold and provided with a backing in the form of a foamed body 20.

EXAMPLE

A heated nickel mold is sprayed with a mold release. Thereafter, a suitable polyurethane reaction mixture of Voranol 410 and Vornnol 4815 polyether polyols, 1,4-butanediol chain extenders, trimethylolpropane cross-linking agent, Dabco 33LV triethylenediamine catalyst and Desmodur W hexamethylenediisocyanate in liquid form is sprayed onto the mold to a depth of 0.1–2 mm, depending upon the desired depth of the membrane switch from the outer surface of the panel. Temperature is maintained at approximately 60° C. and the polyurethane gels in two to three seconds. Thereafter, the membrane switch is positioned on the first layer and in the desired location. A second layer of the liquid polyurethane reaction mixture is then sprayed onto the first layer and over the membrane switch. This layer may be approximately as thick as the first, i.e., 0.1–2 mm. The result of using a spray process, requiring no high pressure, and a curing temperature no greater than 100° C., is absence of damage to the membrane switch.

The resulting shell may be back foamed either while still in the mold or after removal from the mold. Back foaming is done at the same low temperatures as spraying to prevent damage to the switches. Both back foaming and the spray urethane process are well known in the art. The latter is more fully described in SAE Technical Paper 950442 of Thomas W. Karwan, Richard Long, and Gerret M. Peters, Jr., entitled "A Production Proven Polyurethane Skin Technology for Interior Trim Parts."

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. A method of encapsulating a flexible sensor, having a manually operable member, into a body of a vehicular panel having a resilient surface which comprises:

providing a mold having a molding surface of a desired contour;

spraying onto said molding surface, to a thickness of from about 0.1 to about 2 mm, a first layer of a gellable liquid plastic forming material;

curing said first layer to a resiliently solid condition at a temperature no greater than 100° C.;

positioning said flexible sensor on said first layer with said manually operable member in contact with said first layer;

spraying over said first layer and said sensor a second layer of a curable liquid plastic material;

curing said second layer at a temperature no greater than 100° C. to form, with said first layer, a resilient shell with said flexible sensor embedded therein; and removing said resilient shell from said mold.

2. The method of claim 1 including the additional steps of:

applying to said resilient shell a curable foam backing material;

curing said backing material at substantially atmospheric pressure-to form a composite panel of a foam backed resilient shell with said sensor embedded therein and manually actuatable through said first layer.

3. The method of claim 2 wherein said additional steps are performed prior to removing said shell from said mold.

4. The method of claim 1 wherein said first layer is polyurethane.

5. The method of claim 1 wherein said second layer is polyurethane.

6. The method of claim 1 wherein said second layer is sprayed to a thickness of about 0.1 to about 2 mm.

7. The method of claim 4 wherein said second layer is polyurethane.

* * * * *